Patented May 31, 1932

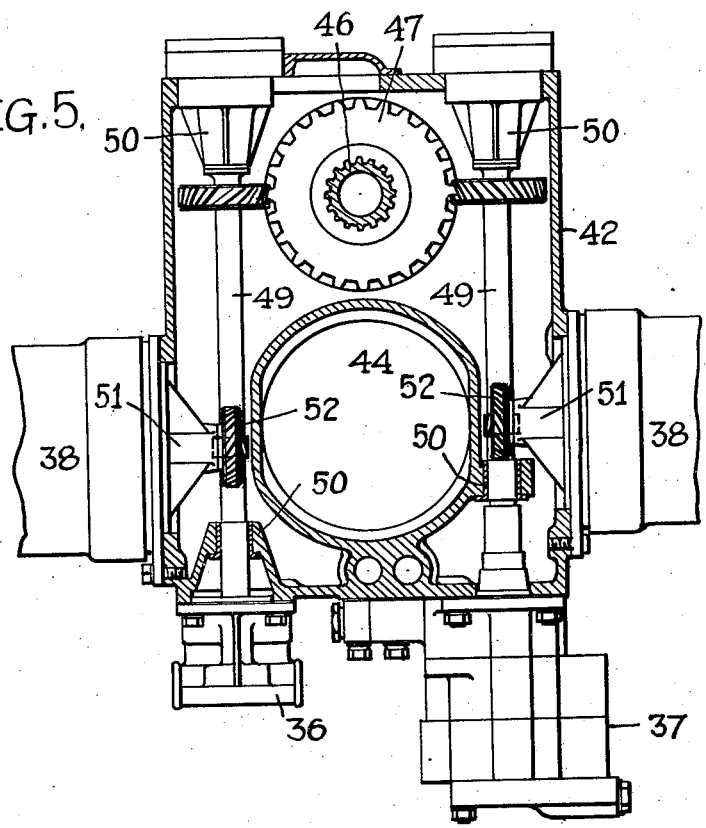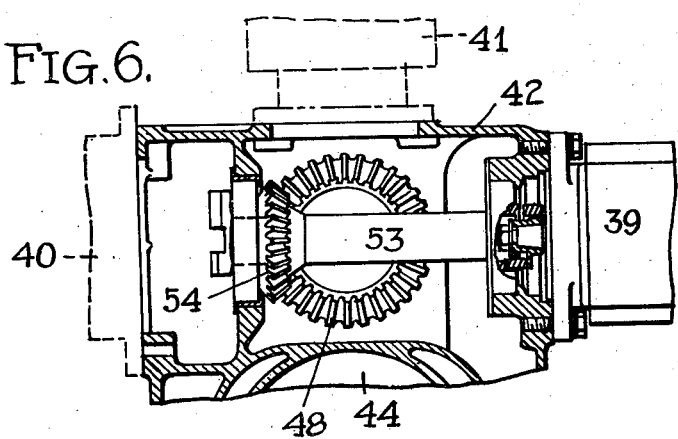

1,860,814

UNITED STATES PATENT OFFICE

ARTHUR NUTT, OF KENMORE, AND ARTHUR H. LEAK, OF HAMBURG, NEW YORK, ASSIGNORS TO CURTISS AEROPLANE & MOTOR COMPANY, INC., A CORPORATION OF NEW YORK

INTERNAL COMBUSTION ENGINE

Application filed July 22, 1927. Serial No. 207,603.

Our invention relates to internal combustion engines and is more particularly concerned with internal combustion engines for aeronautical use.

The characteristics most desired in an aeronautical internal combustion engine are: low weight per horsepower developed; small frontal area or over-all diameter; the attainment of an engine speed of at least 2500 R. P. M. if desired; an overhead valve gear arrangement possessing reliability under all operating conditions; proper care of the products of combustion or exhaust; perfect lubrication; efficient heat regulation thru the use of air shutters or the like; maximum horsepower, with the possibility of exceeding 600 or even 1000 horsepower without a modification of the engine type; ease of installation; and accessibility of accessories after installation and during actual use.

In so far as we are aware, no one heretofore has either proposed or built an aeronautical engine possessing each and all of the characteristics above pointed out. V-type, air and water-cooled, as well as radial cylinder, air-cooled, engines have been built. Each of these types of engine possesses several characteristics which are desirable. The V-type water-cooled engines possess a comparatively small frontal area and admit of the use of a valve gear arrangement capable of operation at engine speeds exceeding 2200 or even 2500 R. P. M. Radial cylinder engines (air-cooled) are desirable in that the weight of the cooling medium (water) and radiator is eliminated and in that the over-all length is considerably less. Where the radial cylinders are staggered, as in a fourteen (14) cylinder radial engine, or where the cylinders are confined to a single radial series, as in nine (9) cylinder radial engine, each individual cylinder must be provided with its individual valve operating mechanism, and such mechanism usually comprises push rods, rocker arms, etc., which cannot, due to inertia forces, be safely and continuously operated at engine speeds exceeding 2000 R. P. M. Moreover, in the design of radial cylinder engines, as at present constructed, the problem of handling the products of combustion is a serious drawback to their installation and use in aircraft for it is necessary that such products be carried away from the engine and discharged at a distant point or points. To attempt to air-cool a V-type motor shows but little, if any, net improvement. The cylinders are heavier and of larger diameter due to the cooling fins and the over-all length and weight of the motor is proportionately increased. The result of the above paradoxial situation is that no distinct advantage lies with either given type of aeronautical engine—some preferring the radial cylinder or air-cooled type and others the V-type water-cooled—depending primarily upon the particular design or type of aircraft within which it is intended that the engine shall be installed.

The object of the present invention is to effect a compromise between the above two recognized engine types and to retain, insofar as possible, the advantages of both. This compromise, as will be hereinafter disclosed, contemplates an engine assembly in which the cylinders are uniformly air-cooled and are arranged radially about the crank shaft axis in banks or groups of two or more cylinders each; in which the valve gear is reorganized to provide for reliable operation at engine speeds exceeding 2200 R. P. M.; in which the over-all diameter of and length of engine is appreciably reduced; in which provision is made for the care of the exhaust; in which baffles are employed to directly assist in the uniform cooling of the engine cylinders; and in which all direct accessories, i. e., the accessories mounted on and directly fastened to the engine, are grouped for accessibility radially about an extension of the crank case at the anti-propeller end of the engine.

Other and further objects and advantages of the invention will be hereinafter set forth.

In the drawings, wherein like reference characters denote like or corresponding parts, Fig. 1 is a side elevation of the engine;

Fig. 5 is a section on the line 5—5 of Fig. 4, and

Fig. 6 is a section on the line 6—6 of Fig. 4.

Figure 1:
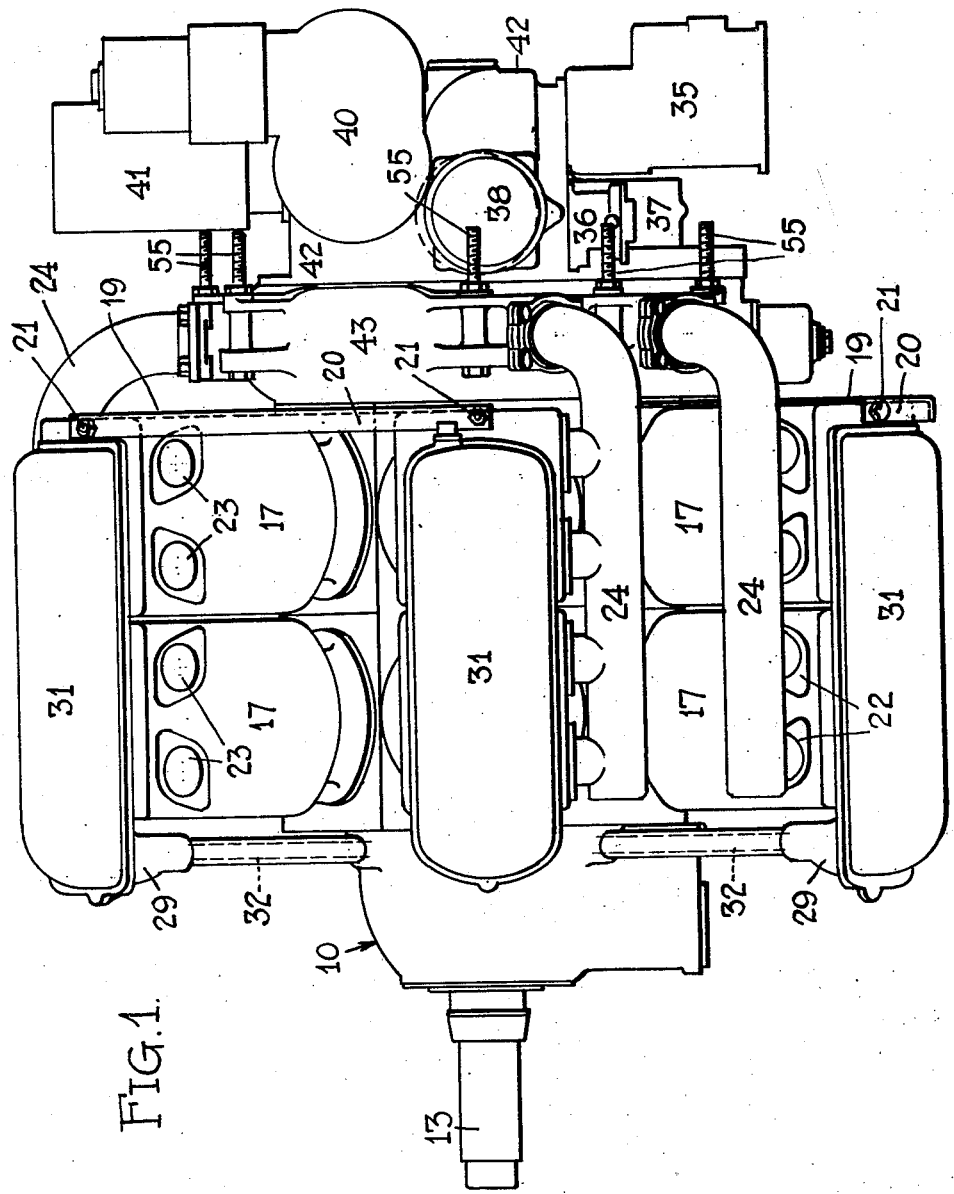

In the embodiment of the invention selected for illustration, a twelve (12) cylinder air-cooled aeronautical internal combustion engine of approximately 600 horsepower at 2200 R. P. M. is shown. The crank case of the engine, designated as 10, is preferably formed in sections. Each crank case section, in transverse section, is substantially hexagonally shaped, and on its interior is provided with one or more bearings 11 within which the crank shaft 12 of the engine is journaled. The crank shaft, unlike the crank case, is longitudinally continuous, and at its opposite ends is extended beyond the corresponding crank case ends to provide separate driving terminals 13 and 14 respectively. Over the driving terminal 13 a propeller (not shown) is adapted to be fitted.

Figure 3:
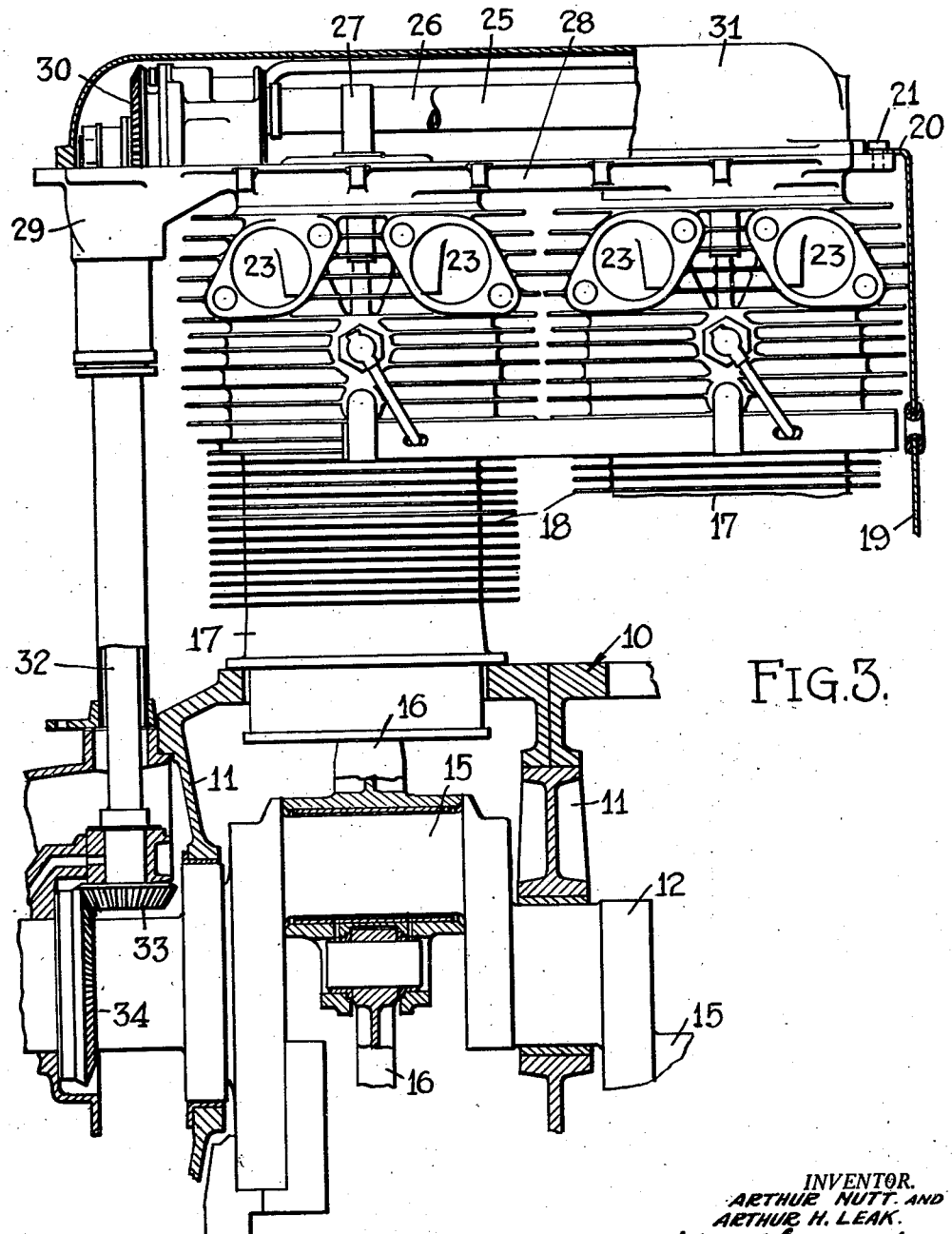
Fig. 3 is a part side elevation and part longitudinal vertical sectional view of one of the cylinder groups, a portion of the crank case, and a porton of the crank shaft, showing the overhead cam shaft arrangement as well as the cam shaft drive.

The crank shaft 12 is a two-throw crank shaft, to each off-set 15 of which is fastened six (6) connecting rods 16. These connecting rods 16 extend radially off from the crank shaft off-sets in two radial series of six each, one connecting rod entering each of the twelve (12) engine cylinders 17. The engine cylinders 17, like the connecting rods 16, extend radially off from the crank shaft axis in two radial series, but unlike the conventional radial cylinder engine, the corresponding cylinders of each of said series, are longitudinally aligned. Preferably the cylinders 17 at their inner ends extend into the transversely divided crank case as indicated in Fig. 3 and with respect to each other are substantially equidistantly circumferentially spaced. In thus uniformly spacing the radially disposed cylinders an even number of cylinder groups are provided, the cylinder groups in each instance having substantially V-shaped air passages extending longitudinally therebetween.

Figure 2:
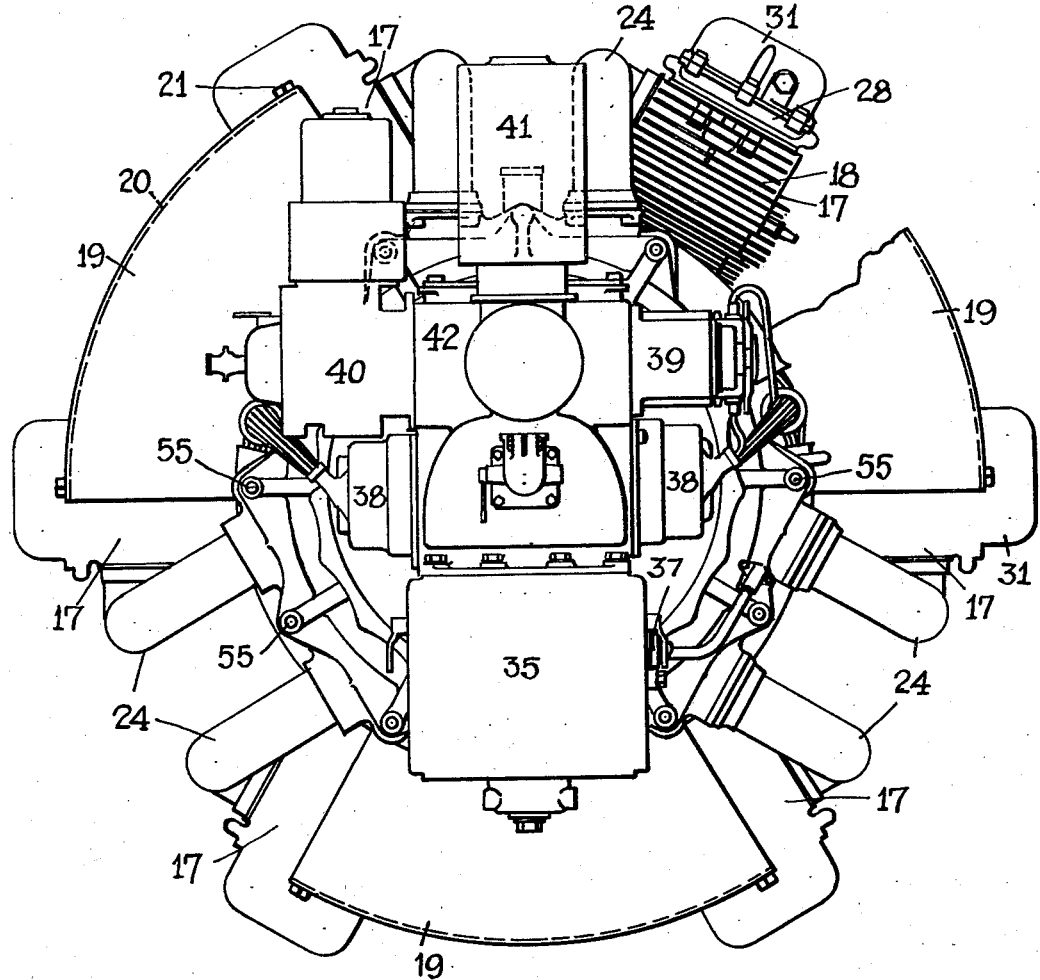
Fig. 2 is a rear end elevation, partly broken away.

Being an air-cooled engine, each cylinder 17 is provided with cooling fins 18. Instead of casting the cylinders 17 of each cylinder group en bloc, each cylinder is separately formed and space provided therebetween for the unobstructed lateral passage of air from one to another of the air passages between adjacent cylinder groups. To better deflect the air uniformly over all of the cooling fins 18, and especially over the cooling fins of the rear cylinders 17 of each cylinder group, a plurality of baffles 19 are provided. Said baffles (see Fig. 2) are preferably substantially fan-shaped and are arranged radially about the crank case 10 directly behind the cylinder groups. At their inner ends the baffles 19 are fastened to the crank case and at their outer ends they are flanged forwardly as at 20 and fastened as at 21 to the rear cylinders of each cylinder group. In an engine of the type herein illustrated, where six (6) equally spaced longitudinally extending air passages are provided, it is essential that half only or three of said longitudinally extending air passages shall be baffled; the remaining half being left unobstructed or unbaffled so that the air confined to the total number of air passages may escape at the rear or anti-propeller end of the engine. In providing baffles alternately at the rear ends of the total number of longitudinally extending air passages, the air upon entering the baffled passages, after cooling the sides of the cylinder walls, is deflected laterally behind and between the cylinders of each group to properly and uniformly cool the otherwise uncooled rear cylinder walls. A temperature difference of less than 20° between front and rear cylinders is thus maintained.

In view of the fact that half of the longitudinally extending air passages between adjacent cylinder groups are baffled as at 19, the cylinders comprising each cylinder group have their intake ports 22 formed therein at one side thereof and their exhaust ports 23 formed therein at the opposite side. The intake ports 22, in each instance, are open to the unbaffled longitudinally extending air passages, whereas the exhaust ports 23 are open to the baffled longitudinally extending air passages. Thus arranged, the intake ports 22 of adjacent cylinder groups, as well as the corresponding exhaust ports 23, throughout the entire group series, open toward one another so that in manifolding said ports a system of manifolding not ordinarily possible in a radial cylinder engine can be employed. This system of manifolding preferably consists, in so far as the intake ports 22 are concerned, of intake manifolds 24 arranged in pairs, each said manifold serving the total number of cylinders comprised in a single cylinder group; the manifolds of each pair being extended into the unbaffled air passages from the rear and being pre-heated to some extent at the bend therein by the heated air escaping between the baffles. The exhaust ports 23, if desired, can be similarly manifolded and the manifolds extended rearwardly to liberate the exhaust at any point or points desired. Ordinarily, in a radial cylinder engine, it is customary to provide an exhaust stack for each individual cylinder, or, in the absence of individual stacks, a so-called ring manifold which, for aerodynamic considerations is undesirable.

Within each engine cylinder, and overhead, a proper number of intake valves and exhaust valves (not shown) are provided. Instead, however, of operating said valves by means of push rods and rocker arms, said valves are operated in the desired timed relation by overhead cam shafts 25 and 26. These cam shafts, two for each cylinder group, are disposed in parallelism and have an over-all length sufficient to span the total number of cylinders comprised in each cylinder group. In Fig. 3 it will be noted that the cam shafts 25 and 26 are mounted in suitable bearings 27 fastened to cylinder head cover plates 28 which are in turn fastened to the cylinder heads. Said cover plates 28 are preferably of one piece construction and are adapted to bridge the space between the cylinders of the respective groups and at the forward end of said groups are adapted to overhang the group series to provide housings 29 within which suitable gearing 30 for the cam shafts is enclosed. Cover plates thus characterized reinforce the cylinders of each cylinder group and at the same time provide an adequate attachment surface to which the cam shaft housings 31 are fastened. A valve gear of the character herein disclosed is essential. At speeds exceeding 2000 R. P. M. push rods and rocker arms, due to inertia forces, are incapable of continued operation for periods of long duration.

The means for driving the cam shafts 25 and 26 (in addition to the gearing 30) comprises a plurality of radially arranged drive shafts 32 which, at their outer ends, enter the cover plate overhangs. Said shafts 32 at their inner ends are carried into the crank case 10, each shaft having mounted on said inner end a bevel gear 33 which meshes with a similar gear 34 mounted on the engine crank shaft. Each said drive shaft is operated at the desired speed of rotation, due to its geared connection with the crank shaft, and in its relation to the cylinder group which it serves, extends radially out from the crank shaft in line with the radial plane of its associated cylinder group.

Figure 4:
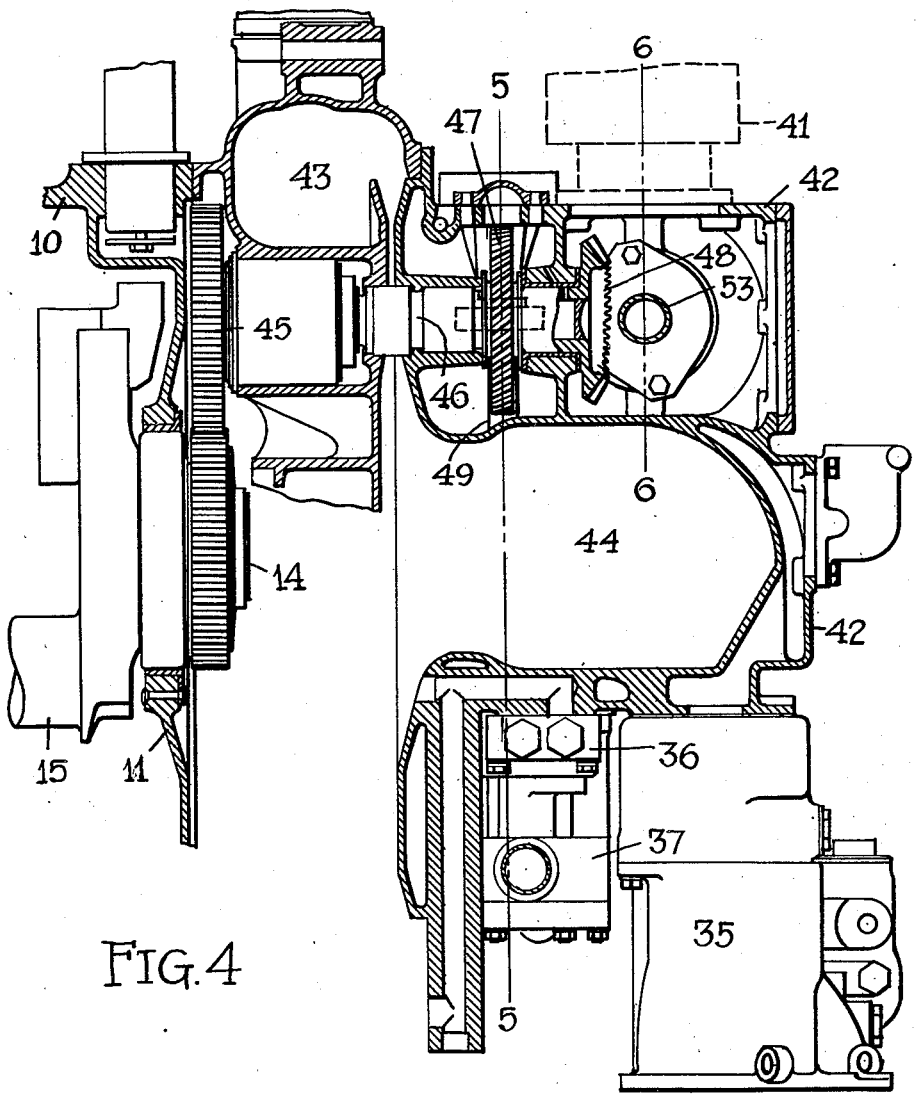
Fig. 4 is a longitudinal vertical sectional view of a portion of the anti-propeller end of the engine showing the relation of the engine accessories thereto as well as the means employed for driving said accessories off the crank shaft.

As is customary in aeronautical internal combustion engines, a certain number of engine accessories are essential to the proper operation of the engine herein described. Such accessories include a carburetor 35, a fuel pump 36, an oil pump assembly 37, two distributors 38—38, a magneto 39, an engine starter 40, and a generator 41. Preferably such accessories are grouped radially about an extension 42 of the crank case 10 so that any or all of such accessories may be removed or replaced with as little inconvenience as possible. The crank case extension 42 is fastened to and against a rear end blower or compressor 43, the latter, as indicated in Fig. 4, being directly fastened to the rear end of the crank case. Said blower 43, which is directly driven off the crank shaft 12, is so formed and constructed as to provide within the crank case extension 42 a fuel induction passage 44. This passage 44 is open at one end to the carburetor 35 and at its opposite end widens outwardly to form the casing within which the blower 43 is enclosed. From said blower casing the fuel mixture is fed radially to the cylinder intake ports 22 thru the intake manifolds 24.

In addition to driving the blower 43, the crank shaft 12, thru its rear end driving terminal 14, is directly geared as at 45 to a counter-shaft 46. This counter-shaft 46 has an axis of rotation parallel with the axis of rotation of the crank shaft tho it is enclosed for the major part within the blower casing and the crank case extension 42. Intermediately of its ends said shaft 46 has splined thereon a spiral gear 47, and upon its rear end a bevel gear 48. At each side of said counter-shaft 46 and directly driven off the worm gear 47, there is provided a vertical shaft 49. Said vertical shafts 49, which extend parallel, are journaled at their opposite ends in bearings 50, and at one end are extended beyond the underside of the crank case extension wall. One of said shafts has mounted at its extended end the fuel pump 36, whereas the other of said shafts is still further extended to drive the oil pump assembly 37; said pumps 36 and 37, like the carburetor 35, being fastened exteriorly of the crank case extension on the underside of its bottom wall. As illustrated in Fig. 5, the shafts 49 are located one each at opposite sides of the fuel induction passage 44. Transversely extending stub shafts 51—51, geared as at 52, one each to each vertical shaft 49, extend laterally out from the fuel induction passage 44 to drive the distributors 38 which are mounted exteriorly of and against the opposite side walls of the crank case extension 42.

The magneto 39 and the engine starter 40 are also mounted exteriorly of and against the opposite side walls of said crank case extension. The driving connection for said accessories 39 and 40 consists of a transverse shaft 53 having a bevel gear 54 mounted thereon and meshing with the bevel gear 48 mounted on the end of the shaft. Said accessories 39 and 40, however, are disposed in a horizontal plane above the corresponding plane of the shafts 51 and in a transverse vertical plane longitudinally removed from the transverse vertical plane of the vertical shafts 49. Moreover, if desired, by the provision of a vertical stub shaft and bevel gear (not shown) the generator 41 may be likewise driven off the bevel gear 48. Preferably said generator 41 is mounted on the exterior top side of the crank case extension 42. Bolts 55, grouped radially about the crank case extension, and carried by the blower casing, provide an appropriate mounting whereby the engine may be installed in an aeroplane.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What we claim is:

1. In an air-cooled internal combustion engine, the combination, of a crank shaft, a plurality of engine cylinders arranged radially about the crank shaft in groups of at least two cylinders each, the corresponding cylinders of each group being substantially equidistantly circumferentially spaced and the cylinders of each group being aligned longitudinally of the crank shaft axis, a cam shaft for each cylinder group mounted at the outer cylinder ends, the cam shafts, in each instance, having an over-all length sufficient to span the total number of cylinders comprised in a single cylinder group, and a cam shaft driving means extending radially off from said crank shaft in line with the equidistantly spaced cylinder groups.

2. In an air-cooled internal combustion engine, the combination, of a crank shaft, a plurality of engine cylinders arranged radially about the crank shaft in groups of at least two cylinders each, the cylinders of each group being aligned longitudinally of the crank shaft axis, a cylinder head cover plate for each cylinder group, each said plate having an over-all length sufficient to span the total number of cylinders comprised in a single cylinder group, a cam shaft for each cylinder group likewise having an over-all length sufficient to span the total number of cylinders comprised in a single cylinder group, bearings for each said cam shaft mounted on the respective plates, and driving means for said cam shafts.

3. In an air-cooled internal combustion engine, the combination, of a crank shaft, an even number of engine cylinders arranged radially about the crank shaft in groups of at least two cylinders each, the cylinders of each group being aligned longitudinally of the crank shaft axis and the cylinder groups, with respect to each other being substantially equidistantly circumferentially spaced to provide an even number of passages for the cooling air, and baffles mounted behind said cylinder groups to close half only of the total number of said passages, said baffles being so related to said cylinder groups as to deflect the impinging air laterally over the rear engine cylinders into the unbaffled half of said air passages where it is free to escape.

4. In an air-cooled internal combustion engine, the combination, of a crank shaft, an even number of engine cylinders arranged radially about the crank shaft in groups of at least two cylinders each, the cylinders of each group being aligned longitudinally of the crank shaft axis and the cylinder groups, with respect to each other being substantially equidistantly circumferentially spaced to provide an even number of passages for the cooling air, baffles mounted behind said cylinder groups to close half only of the total number said passages, said baffles being so related to said cylinder groups as to deflect the impinging air laterally over the rear engine cylinders into the unbaffled half of said air passages where it is free to escape, and a fuel intake manifold for each cylinder group, said manifolds in each instance being arranged in pairs to extend into the unbaffled air passages only.

5. In an air-cooled internal combustion engine, the combination, of a crank shaft, a plurality of engine cylinders arranged radially about the crank shaft in groups of at least two cylinders each, the cylinders of each group being aligned longitudinally of the crank shaft axis and the cylinder groups, with respect to each other, being substantially equidistantly circumferentially spaced to provide an even number of passages for the cooling air, each cylinder having formed therein, at opposite sides thereof, an intake port and an exhaust port, the intake ports of adjacent cylinder groups and the exhaust ports of adjacent cylinder groups being so relatively arranged that the corresponding ports in each instance and of the total number of cylinder groups are juxtaposed, intake manifolds commonly serving the total number of intake ports for each cylinder group, said manifolds being arranged in pairs to extend alternately into half only of the total number of air passages as defined by adjacent cylinder groups, and air baffles for the remaining half of said air passages mounted at the rear end of said cylinder groups.

6. In an internal combustion engine, the combination, of a crank shaft, a crank case, a counter-shaft mounted at one end of the crank case and driven off the crank shaft, said counter-shaft having an axis of rotation in parallelism with the axis of rotation of the crank shaft, a housing mounted at one end of the crank case and in continuation thereof within which said counter-shaft is enclosed, a carburetor mounted on the underside of said housing, said carburetor being in open communication with a fuel induction passage extending thru said housing, and a plurality of separately removable exteriorly mounted engine accessories grouped radially about said housing and driven off said counter-shaft.

7. In an internal combustion engine, the combination, of a crank shaft, a crank case, a counter-shaft mounted at one end of the crank case and driven off the crank shaft, said counter-shaft having an axis of rotation in parallelism with the axis of rotation of the crank shaft, a housing mounted at one end of the crank case and in continuation thereof within which said counter-shaft is enclosed, a carburetor mounted on the underside of said housing, said carburetor being in open communication with a fuel induction passage extending thru said housing, two vertical shafts mounted within said housing and driven off said counter-shaft, said two vertical shafts being disposed respectively one each at opposite sides of said fuel induction passage, engine accessories mounted exteriorally of said housing, one each at opposite sides thereof, and a shaft driven off each said vertical shaft for driving said engine accessories.

8. In an internal combustion engine, the combination, of a crank shaft, a crank case, a counter-shaft mounted at one end of the crank case and driven off the crank shaft, said counter-shaft having an axis of rotation in parallelism with the axis of rotation of the crank shaft, a housing mounted at one end of the crank case and in continuation thereof within which said counter-shaft is enclosed, a carburetor mounted on the underside of said housing, said carburetor being in open communication with a fuel induction passage extending thru said housing, two vertical shafts mounted within said housing and driven off said counter-shaft, said two vertical shafts being disposed respectively one each at opposite sides of said fuel induction passage and being extended at one end beyond one side of the housing wall, an engine accessory directly driven off the extended end of each said vertical shaft, said engine accessories in each instance being mounted exteriorly of said housing, other and further engine accessories mounted exteriorly of said housing, one each at opposite sides thereof, and a shaft driven off each said vertical shaft for driving said last mentioned engine accessories.

9. In an internal combustion engine, the combination, a of a crank shaft, a crank case, a counter-shaft mounted at one end of the crank case and driven off the crank shaft, said counter-shaft having an axis of rotation in parallelism with the axis of rotation of the crank shaft, a housing mounted at one end of the crank case and in continuation thereof within which said counter-shaft is enclosed, a carburetor mounted on the under-side of said housing, said carburetor being in open communication with a fuel induction passage extending thru said housing, two vertical shafts mounted within said housing and driven off said counter-shaft, said two vertical shafts being disposed respectively one each at opposite sides of said fuel induction passage and being extended at one end beyond the underside of the housing wall, a transverse shaft enclosed within said housing and directly driven off said counter-shaft, and separately removable exteriorly mounted engine accessories grouped radially about said housing, said accessories being disposed respectively one each at the extended end of each said vertical shaft and one each at the opposite ends of said transverse shaft.

10. In an internal combustion engine, the combination, of a crank shaft, a crank case, a counter-shaft mounted at one end of the crank case and driven off the crank shaft, said counter-shaft having an axis of rotation in parallelism with the axis of rotation of the crank shaft, a housing mounted at one end of the crank case and in continuation thereof within which said counter-shaft is enclosed, a carburetor mounted on the underside of said housing, said carburetor being in open communication with a fuel induction passage extending thru said housing, two vertical shafts mounted within said housing and driven off said counter-shaft, said two vertical shafts being disposed respectively one each at opposite sides of said fuel induction passage and being extended at one end beyond the underside of the housing wall, a transverse shaft enclosed within said housing and directly driven off each said vertical shaft, and separately removable exteriorly mounted engine accessories grouped radially about each said housing, said accessories being disposed respectively one each at the extended end of each said vertical shaft, one each at the opposite ends of the transverse shaft directly driven off said counter-shaft, and one each at one end of each transverse shaft driven off said vertical shafts.

11. In an air cooled internal combustion engine, a crank shaft, a number of engine cylinders arranged radially about the crank shaft in groups of at least two cylinders each, the cylinders of each group being aligned longitudinally of the crank shaft axis and the cylinder groups being circumferentially spaced to provide passages for cooling air, and means for deflecting the cooling air laterally over the rear engine cylinders.

In testimony whereof we hereunto affix our signatures.

ARTHUR NUTT.
ARTHUR H. LEAK.